Sept. 16, 1969    K. V. RUPPENEIT ET AL    3,466,926
INSTRUMENT FOR MEASURING STRAIN PRODUCED
BY PRESSURE OF SOLID ROCK
Filed Feb. 28, 1967

INVENTORS
KONSTANTIN VLADIMIROVICH RUPPENEIT
EVGENY SEMENOVICH PRIGOZHIN
JURY RODIONOVICH PERKOV

United States Patent Office 3,466,926
Patented Sept. 16, 1969

3,466,926
INSTRUMENT FOR MEASURING STRAIN PRODUCED BY PRESSURE OF SOLID ROCK
Konstantin Vladimirovich Ruppeneit, Tovarischesky per. 8, kv. 8; Evgeny Semenovich Progozhin ul. Galgoleva 24, korp. 2, kv. 14; and Jury Rodionovich Perkov, Lukhovitskaya ul. 6, kv. 2, all of Moscow, U.S.S.R.
Filed Feb. 28, 1967, Ser. No. 619,282
Int. Cl. E21b 47/021; G01n 3/12
U.S. Cl. 73—151                                    6 Claims

ABSTRACT OF THE DISCLOSURE

An instrument for measuring strain produced by the pressure of solid rock by means of telescopic feelers contacting with the walls of a bore hole drilled in the solid rock and a device for measuring the movement of the bore hole walls under the influence of liquid or gas forced under an electric capsule which shrouds the instrument casing being connected to the telescopic feelers. There is also provided means for disconnecting the measuring device from the casing during measurements.

---

The present invention relates to instruments for measuring strain produced by pressure of the rock in solid form.

More specifically, the invention relates to instruments for measuring strain produced by solid rock pressure, by way of installation in boreholes drilled in the solid rock which develop hydrostatic pressure on the walls of a borehole with the instruments measuring the movement in the walls under load.

Such instruments generally consist of a casing enshrouded by an elastic capsule, with gas or liquid being forced underneath the capsule, and a measuring cell to gauge either radial movement in the walls under load with the aid of sliding contact feelers or changes in the cross-sectional perimeter of the borehole.

However, when measurements are taken in hard rock the value of movement in the walls of the borehole under testing is so minute (the measurement range of a few microns) that the known instruments are not capable of giving sufficiently accurate results, particularly if such measurements are attempted in connection with small diameter (of several centimeters) boreholes.

Any attempts to increase the range in measuring the movement in the walls by raising the thrust force have also met with substantial difficulties due to the need for sealing the gap between the instrument and the walls of a borehole.

Moreover, any instrument for measuring the movement in the walls should ensure coverage of the adjustment clearance between the instrument and the walls, the value of which is several thousandths of an inch larger than that of the movement in the walls of a borehole.

Feelers of a measuring instrument which are pressed against the walls of a borehole must be relieved from the thrust produced by the liquid or gas underneath the capsule, otherwise substantial errors may occur in measurements at the points of contact between the feelers and the surface of the rock.

Research has proved that the instrument casing, as the pressure rises owing to thrust of the liquid or gas underneath the capsule, is displaced in respect of the borehole, whereas the value of such displacements is much higher than that of the movement in the walls under measurement. Thus, the displacement of the instrument leads to substantial errors in the readings taken.

The object of the present invention is to eliminate the aforesaid difficulties and disadvantages by providing an instrument which will ensure sufficiently high accuracy of measurements of the strain produced by the pressure of rock in the solid.

According to the invention, the cell for measuring the movement in the walls of a borehole is connected with the casing of the instrument through a gripping mechanism which is so constructed that the cell is released from the casing during the period the measurements are effected. Consequently, during actual measurements, the cell is suspended floatably thereby only contacting the walls of the borehole through its sliding feelers.

In the preferred embodiment of the invention the gripping mechanism is defined by two arms turnable under force which grip the cell for measuring the movement in the borehole walls, and release the cell for the period of actual measurements.

In order that the measuring cell can cover the adjustment clearance with the aid of its sliding feelers while ensuring sufficiently high accuracy of measurements, the cell includes a frame provided with elastic plates mounting strain gauges and feelers secured in the midway portions of the plates. The arms gripping the frame cause elastic deformation of its plates thus retracting the feelers inside the casing of the instrument. When the frame is released from the arms, the plates straighten out elastically allowing the feelers to push out freely into the clearance between the casing and the walls of the borehole until they press against the surface of rock.

The arms gripping the frame of the measuring cell are turned by a spring interposed between their ends, and the frame is released from the arms under the effect of the pressure of gas or liquid underneath the capsule, with the pressure transferred to the plungers mounted in the casing, and the plungers actuating the ends of the arms to compress the spring. The same purpose may be attained by using an electromagnet.

Another assembly has been also found effective and includes two collets secured on the ends of the instrument casing which act as a thrusting device. The pressure of liquid or gas underneath the elastic capsule is transferred to the collets to hold the instrument in the bore-hole.

The aforesaid embodiments have ensured considerable compactness of the instrument and substantial accuracy of the measurements.

Embodiments of the present invention will now be described by way of example with reference to the accompanying drawings, in which.

Figure 1:
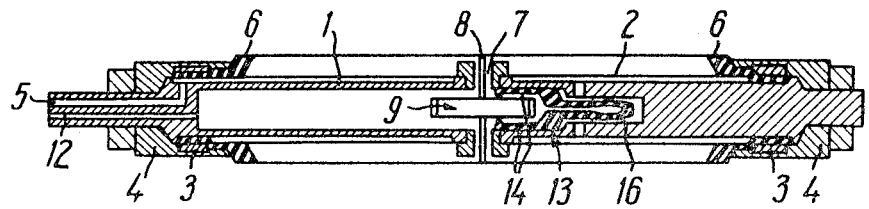
FIG. 1 is a longitudinal sectional view of the instrument freely mounted in a borehole.

A casing 1 (FIG. 1) of the instrument is shrouded in an elastic capsule 2 secured on the instrument faces with a ring 3, collets 4 of a thrusting device embracing the rings, and the side surfaces of the collets are slotted longitudinally.

The installation of the instrument in the borehole and the pressure against the borehole walls is effected by forcing gas or liquid underneath the elastic capsule 2 through passages 5 in the instrument casing 1. To prevent the capsule 2 from being pushed into the clearance between the side surfaces of the collets 4 and the walls of the borehole, stiff rubber gaskets 6 are interposed at one of its ends between the capsule 2 and collets 4.

Openings 7 for passing sliding contact feelers 8 of a cell 9 are provided in the casing 1 and capsule 2. The cell serves to measure the movement in the borehole walls under pressure of liquid or gas transferred through the capsule 2.

The measuring cell 9 (FIGS. 3, 2) comprises elastic plates 10 provided with strain gauges 11 cemented thereon and are assembled into a complete bridge and connected through wires with the measuring apparatus at the head of the borehole. The connecting wires are led through a passage 12 (FIG. 1) in the casing 1.

Figure 2:
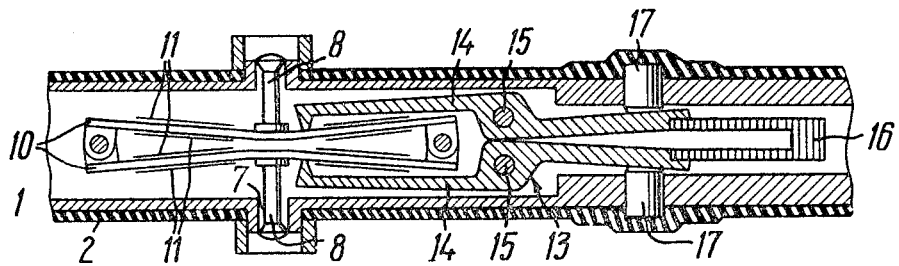
FIG. 2 is a fragmentary view of the instrument with the feelers retracted inside the casing.
Figure 3:
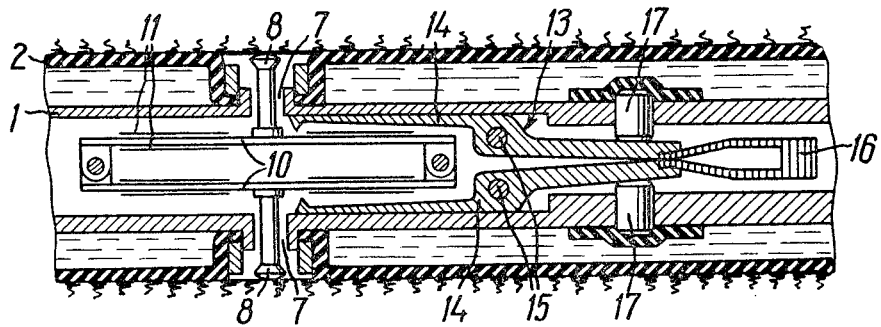
FIG. 3 is a fragmentary view of the instrument with the feelers pushed out of the casing and capsule of the instrument.

The measuring cell 9, in the idle position, is connected to the casing 1 of the instrument via a gripping mechanism 13 (FIGS. 1 and 3), and arms 14 of the mechanism turnable around axes 15 are thrust by a spring 16 to grip the plates 10, whereby the plates 10 are bent elastically as shown in FIG. 2 thus retracting the feelers 8 inside the casing 1.

The instrument in such position is installed in the borehole, and liquid or gas is then forced through the passage underneath the capsule 2. The capsule which is expanded under pressure of liquid or gas actuates the collets 4 of the thrusting device, which are pressed against the walls of the borehole maintaining the instrument in position, and imparting thrust to the walls of the borehole. Simultaneously, the gaskets 6 prevent the capsule 2 from being pushed out into the clearance between the borehole walls and the collets 4.

Simultaneously, the measuring cell 9 is released from the grip of the arms 14 of the mechanism 13 by actuating plungers 17 (FIGS. 1, 3) in the instrument casing 1 under the pressure of liquid or gas. The stroke of the plungers acts on the ends of the arms 14 and compresses the spring 16. The plates 10 of the measuring cell 9 are straightened thus pushing the feelers 8 out through the openings 7 in the casing until they are pressed against the walls of the borehole. Hence, when no measurements are being taken, the measuring cell 9 is not connected with the casing 1 and the capsule 2, and is only pressed against the borehole walls directly through feelers 8.

A sufficiently high accuracy of measurements is attained through the use of the present invention. Moreover, the instrument is applicable for the installation in boreholes of 40 to 50 mm. in diameter whereas the heretofore known instruments of a similar type require boreholes of 180 to 240 mm. diameter for their installation, which involve difficulties and hard-and-time-consuming work in drilling. It follows then that solid rock can be tested by the aforesaid instrument in a wide range of applications with a much lower effort and time.

While an embodiment of the present invention has been described herein it is obvious that changes in details of construction can be resorted to without departing from the spirit of the invention.

What is claimed is:

1. An instrument for measuring strain produced by pressure of solid rock comprising: a casing said instrument an elastic capsule shrouding said casing, means for forcing liquid or gas under said capsule, feelers capable of moving out relative to said casing and capsule and coming into contact with the walls of a borehole drilled in the solid rock; a device for measuring the movement of the borehole walls caused by the pressure of liquid or gas forced under said capsule, said device being connected to said feelers a gripping mechanism for connecting said device to said casing, and means corresponding to the pressure of the forced liquid or gas for disconnecting the gripping mechanism from said device during measurements.

2. An instrument for measuring strain produced by pressure of rock in the solid comprising: a casing for said instrument, an elastic capsule shrouding said casing, means for forcing liquid or gas under said capsule, feelers capable of moving out relative to said casing and capsule and contacting with the walls of a borehole drilled in the solid rock, a device for measuring movement of the borehole walls caused by the pressure of liquid or gas forced under said elastic capsule, said device being connected to said feelers; two positively turnable levers gripping said device, and means corresponding to the pressure of the forced liquid or gas for disconnecting said levers from said device during measurements.

3. An instrument for measuring strain produced by the pressure of solid rock comprising a casing for said instrument; an elastic capsule shrouding said casing, means for forcing liquid or gas under said capsule, feelers capable of moving out relative to said casing and capsule and contacting the walls of a borehole drilled in the solid rock, a frame including elastic plates provided with strain gauges operably connected with said feelers, two positively turnable levers gripping said frame of elastic plates, means corresponding to the pressure of the forced liquid or gas for disconnecting said levers from said frame during measurements.

4. An instrument for measuring strain produced by the pressure of solid rock comprising a casing for said instrument, an elastic capsule shrouding said casing, means for forcing liquid or gas under said capsule, feelers capable of moving out relative to said casing and capsule and contacting with the walls of a borehole drilled in the solid rock, a device for measuring the movement of the borehole walls caused by the pressure of liquid or gas forced under said elastic capsule, said device being connected with said feelers, two positively turnable levers gripping said device, a spring interposed between said levers and maintaining the ends of the levers in the extended position, and plungers installed in said casing forcing the ends of said levers out when liquid or gas is forced under said capsule.

5. An instrument for measuring strain produced by the pressure of solid rock comprising a casing for said instrument, an elastic capsule shrouding said casing, means for forcing gas or liquid under said capsule, feelers capable of moving out relative to said casing and capsule and connecting with the walls of a borehole drilled in the solid rock, a device for measuring the movement in the borehole walls caused by the pressure of liquid or gas forced under said elastic capsule, the device being connected to said feelers, a gripping mechanism for connecting the device with said casing, means corresponding to the pressure of the forced liquid or gas for disconnecting said gripping mechanism from said device during measurements, and a thrusting device fixed on said casing and serving to maintain said instrument in the borehole in position during measurements.

6. An instrument for measuring strain produced by the pressure of solid rock comprising a casing for said instrument an elastic capsule shrouding said casing, means for forcing gas or liquid under said capsule feelers capable of moving out relative to said casing and capsule and contacting with the walls of a borehole drilled in the solid rock, a device for measuring the movement in the borehole walls caused by the pressure of liquid or gas forced under said capsule, the device being connected to said feelers, a gripping mechanism for connecting said device with said casing, means corresponding to the pressure of the forced liquid or gas for disconnecting said gripping mechanism from said device during measurements, and two collets secured on the faces of said casing and pressed against the walls of the borehole when the liquid or gas is forced under said capsule.

References Cited

UNITED STATES PATENTS 2,927,459    3/1960    Farrington _____ 73—151
3,364,737    1/1968    Comes _____ 73—151

RICHARD C. QUEISSER, Primary Examiner

JERRY W. MYRACLE, Assistant Examiner

U.S. Cl. X.R.

33—178; 73—84